US012709574B2

(12) United States Patent
Miltz

(10) Patent No.: US 12,709,574 B2
(45) Date of Patent: Aug. 18, 2026

(54) PAVEMENT REPAIR COMPOSITIONS, KITS, AND METHODS

(71) Applicant: John C Miltz, Marco Island, FL (US)

(72) Inventor: John C Miltz, Marco Island, FL (US)

(73) Assignee: John C. Miltz, Marco Island, FL (US)

( * ) Notice: Subject to any disclaimer, the term of this patent is extended or adjusted under 35 U.S.C. 154(b) by 715 days.

(21) Appl. No.: 17/896,288

(22) Filed: Aug. 26, 2022

(65) Prior Publication Data

US 2023/0090198 A1 Mar. 23, 2023

Related U.S. Application Data

(60) Provisional application No. 63/237,733, filed on Aug. 27, 2021.

(51) Int. Cl.

*C04B 26/06* (2006.01)
*C04B 14/06* (2006.01)
*C04B 22/06* (2006.01)
*C04B 24/12* (2006.01)
*C04B 103/00* (2006.01)
(Continued)

(52) U.S. Cl.

CPC .............. *C04B 26/06* (2013.01); *C04B 14/06* (2013.01); *C04B 22/06* (2013.01); *C04B 24/121* (2013.01); *C04B 2103/0079* (2013.01); *C04B 2103/12* (2013.01); *C04B 2111/72* (2013.01)

(58) Field of Classification Search

CPC ......... C04B 26/06; C04B 14/06; C04B 22/06; C04B 24/121; C04B 2103/0079; C04B 2103/12; C04B 2111/72; C04B 2111/0075
See application file for complete search history.

(56) References Cited

U.S. PATENT DOCUMENTS 4,346,183 A * 8/1982 Hyde ...................... C04B 26/06 524/764
9,328,024 B2 5/2016 Kao et al.
(Continued)

FOREIGN PATENT DOCUMENTS

EP 0047120 A1 * 3/1982 ............. C04B 26/06
EP 0599733 A1 * 6/1994 ............. C04B 26/06
(Continued)

OTHER PUBLICATIONS

KR 1739365 B1_Machine Translation (Year: 2017).*
(Continued)

*Primary Examiner* — Amber R Orlando
*Assistant Examiner* — Anastasia A. Kuvayskaya
(74) *Attorney, Agent, or Firm* — John L. DeAngelis; Wolter Van Dyke Davis, Pllc

(57) ABSTRACT

The invention relates to a product and method for repair of roadway or pavement damage such as potholes, concrete/asphalt joints, and other damage to paved surfaces. The product can be adjusted in terms of the cure time of the product, allowing the user to customize the product for best use in the particular repair being made. Fast cures can be obtained of 5 minutes or less, suitable for quick repair of a small defect in pavement, or the cure time can be extended to 60 or more minutes, suitable for larger projects that can take many hours to complete. The product, when mixed, handles like easily pourable concrete mix, but acts like a hot mix repair when cured.

2 Claims, 3 Drawing Sheets

(51) Int. Cl.
*C04B 103/12* (2006.01)
*C04B 111/72* (2006.01)

(56) References Cited

U.S. PATENT DOCUMENTS

| | | | | |
|---|---|---|---|---|
| 10,428,217 | B2 | 10/2019 | Arnold | |
| 2009/0067926 | A1 | 3/2009 | Greer | |
| 2014/0056643 | A1 | 2/2014 | Kao et al. | |
| 2020/0140602 | A1* | 5/2020 | Bunzen | C08G 18/672 |

FOREIGN PATENT DOCUMENTS

| | | | | | |
|---|---|---|---|---|---|
| JP | H0740447 | A | * | 2/1995 | C04B 30/02 |
| JP | WO-2005040498 | A1 | * | 3/2007 | E01C 11/005 |
| KR | 1739365 | B1 | * | 5/2017 | C08K 5/14 |

OTHER PUBLICATIONS

JP H0740447 A_Machine Translation (Year: 1995).*
Benzoyl Peroxide_Product Specification retrieved from www.parchem.com benzoyl-peroxide-002863-utm_source-google-utm_medium-pmax-utm_campaign-max_1.8-gad_source-1-gclid-002863.pdf on Apr. 10, 2025 (Year: 2025).*
WO-2005040498_Machine Translation (Year: 2005).*
Degafill™ Permanent Pothole Repair. (Jun. 14, 2022). Retrieved Aug. 23, 2022, from https://www.degafloor.com/mma-resin-flooring-products/degafill-permanent-pothole-repair/.

* cited by examiner

PAVEMENT REPAIR COMPOSITIONS, KITS, AND METHODS

CROSS-REFERENCE TO RELATED APPLICATIONS

This application claims the benefit of U.S. provisional application Ser. No. 63/237,733, fled 27 Aug. 2021. The entire contents of this application are hereby incorporated by reference as if fully set forth herein.

BACKGROUND

1. Field of the Invention

The invention relates to the field of pavement repair, including roadways, parking lots, raceways, sidewalks, and the like, including asphalt and concrete surfaces. Embodiments include formulations and methods for repair which can be adjusted in terms of cure time to allow use for many different asphalt/concrete repair projects.

2. Background of the Invention

Currently used pothole repair formulations usually include an expensive amount of binder and have an extremely thick consistency. The thick consistency differs significantly from the consistency of a typical hot-mix asphalt that is familiar to road crews, which can lead the user to be less comfortable with such formulations and consider them inferior. The thick consistency also can mean that heavy-duty equipment and additional time is needed for mixing the formulation and performing the repair, making their use more difficult and expensive. Therefore, there is a need in the art for a less expensive pothole repair formulation with a better consistency and ease of use.

Generally, two methods are commonly used for repair of potholes or damage to asphalt in the United States. In the hotmix method, a rectangular portion of the pavement is cut out with a saw around the damaged area to form a rectangular area which is a minimum of about four feet by four feet. The requirement for this size generally is due to the size requirement of the repair equipment. The loose rubble underneath then is dug out and the area is tamped down, optionally with gravel. A spray binder solution is applied to the surface to be repaired, hot asphalt brought in by a special vehicle is deposited into the hole, a vibratory tamper or roller is used to compress the asphalt, the mixture is allowed to cure for about 12-36 hours. Special equipment and training are required to transport the hotmix at typical temperatures of about 325-350° F. and to prepare the site for repair. In cold weather, this can be even more difficult. The transport equipment is very expensive, for example over $250.000, and requires both extensive ongoing maintenance and special licensure to operate. Further, the road must be partially closed for at least two days for the repair.

In the cold patch method, a cold derivative of the asphalt used for hotmix repairs is shipped to the location in a bag or bucket and water optionally is added. Such formulations are often sold as "cold patch" kits. The defect in the pavement can be cut out as described above for hotmix applications, and optionally is undercut so that once the mixture conforms to the shape of the defect it will not easily come out for a longer lifespan of the repair. The mix is placed in the hole to be repaired with additional material to make a slight hump. Current cold patch formulations also require a physical installation with vigorous tamping to force repair material into the cavity. For this type of repair, the material is placed in the pothole and tamped down with force, leaving the material "proud" (i.e., leaving a hump of material above the surface level) because the material will settle further after tamping. The amount of material to leave above the pavement surface is, at best, a guess, as to how much the compound will settle over time. The chances the correct amount of material that will result in a level installation after settling is slim at best. Proper training is required on the proper techniques and methods for successful repair. This type of repair only lasts days to weeks, to possibly months, but is less expensive and only a temporary measure which is not smooth with the surrounding pavement. As the cold patch material fails, the material creates loose aggregate type material over the road and the surrounding areas, which can become a hazard for vehicles, and especially bicycles, and motorcycles, and adds trash to the landfills since cold patches are temporary.

A common issue with these products is that they lack adhesion to the pavement material or surface, whether asphalt or concrete. Products using either method just sit in the pothole or other defect and stay in place by conforming to the shape of the defect. In some cases, a spray-on binder is used as an adhesive separate from the product. These types of repairs require the defect to be of a certain depth in order to remain in place, so often need to be enlarged, deepened, and dug out, sometimes significantly. This adds cost to the repair in labor, time, and additional materials.

The discussion of shortcomings and needs existing in the field prior to the present invention is in no way an admission that such shortcomings and needs were recognized by those skilled in the art prior to the present disclosure.

There are six frequently-occurring conditions that need asphalt pavement repair, including potholes, delamination, slippage, raveled pavement, alligator pavement, and concrete/asphalt joints. The two current repair methods in use for pavement repair (cold patch and hot mix) cannot be used for 5 out of 6 of these repair types for a permanent repair without full cutout of the damaged area and complete repaving. In addition, the products' curing time cannot be adjusted to allow for both quick-curing small projects and larger, more time-consuming projects. Thus, there is a great need in the art for improved compositions and methods for pavement repair.

SUMMARY OF THE INVENTION

In view of the need in the art for improved pothole and other filler compositions for roadway repair and methods of use, the invention described herein provides compositions for repair of roadways and any paved area which provide sturdy and long-lasting repairs of different types of defects and damage, and with adjustable cure times.

In particular, the present invention relates, in some embodiments, to a composition for roadway repair, comprising: a) about 25 wt % to about 51 wt % of a solution comprising about 20% to about 30% of one or more acrylic or methacrylic polymer precursor binder compounds; b) about 18 wt % to about 74 wt % of one or more fillers; c) about 14 wt % to about 57 wt % of silica sand; d) about 0 wt % to about 2.25 wt % of one or more pigments; and e) about 0 wt % to about 2 wt % percent by weight of one or more rheology additives. In some compositions, the one or more polymer precursor binder compounds may be selected from the group consisting of methacrylates, methyl acrylates, ethyl acrylates, 2-chloroethyl vinyl ether, 2-ethylhexyl acrylate, hydroxyethyl methacrylate, butyl acrylate, butyl methacrylate, and trimethylolpropane triacrylate. For example, according to some embodiments, the one or more polymer precursor binder compounds may comprise methyl methacrylate.

In certain embodiments, the one or more fillers may be selected from the group consisting of calcium carbonate ($CaCO_3$), titanium dioxide ($TiO_2$), polyolefin pulp, fumed silica, and cellulose fibers. For example, the filler may be ground calcium carbonate.

In certain embodiments, the silica sand may be resin coated.

In certain embodiments, the pigment may be an inorganic iron oxide.

In certain embodiments, the composition may further comprise N,N-dimethyl-p-toluidine.

Various embodiments relate to compositions comprising: a) about 30 wt % to about 35 wt % of a solution containing about 20% to about 30% of one or more acrylic or methacrylic polymer precursor binder compounds; b) about 30 wt % to about 40 wt % of one or more fillers; c) about 9 wt % to about 30 wt % of silica sand; d) about 0.5 wt % to about 1 wt % of one or more pigments; and e) about 0.1 wt % to about 0.5 wt % percent by weight of one or more rheology additives.

Various embodiments may relate to products as described above which further comprise: a) one or more aggregate composition; and b) one or more radical initiator.

In certain embodiments, the aggregate composition may be selected from the group consisting of stone, gravel, and quartz silica. For some applications, quartz silica may be preferred.

In certain embodiments, the radical initiator may be a peroxide compound, such as, for example, a granular benzoyl peroxide.

In certain embodiments, the compositions may further comprise N,N-dimethyl-p-toluidine.

Various embodiments relate to a composition for roadway repair, comprising: a) about 8 wt % to about 23 wt % of a 20 wt % to 30 wt % solution of methyl methacrylate; b) about 0 wt % to about 77 wt % quartz silica aggregates; c) about 0.5 wt % to about 1.4 wt % granular benzoyl peroxide; d) about 0.05 wt % to about 0.82 wt % one or more rheology additives; e) about 6 wt % to about 26 wt % reason coated silica sand; f) about 6 wt % to about 33 wt % ground calcium carbonate; g) about 0 to about 1.1 wt % inorganic iron oxide; and h) optionally N,N-dimethyl-p-toluidine.

Various embodiments relate to a roadway repair kit, comprising: a) a first container containing the composition for roadway repair of claim 1; b) a second container containing an aggregate composition; c) a third container containing a peroxide radical initiator; and d) optionally a fourth container containing N,N-dimethyl-p-toluidine.

Various embodiments relate to a roadway repair kit, comprising: a) a first shakable container with a resealable lid comprising the composition for roadway repair of claim 1 and an aggregate composition; b) a second container containing a peroxide radical initiator, and c) a third container containing N,N-dimethyl-p-toluidine.

Various embodiments relate to a method for repairing a damaged area of a substrate. The method may comprise filling the damaged area with a composition for roadway repair as described above, wherein the substrate may be selected from asphalt, concrete, or a combination thereof. Also, various embodiments include a method for repairing a damaged area of a substrate. The method may comprise adjusting the cure time of the composition for roadway repair of compositions described above by adding N,N-dimethyl-p-toluidine to provide a faster cure time depending on how much time preparing and pouring the composition takes.

BRIEF SUMMARY OF THE DRAWINGS

Many aspects of this disclosure can be better understood with reference to the following figures.

Figure 1:
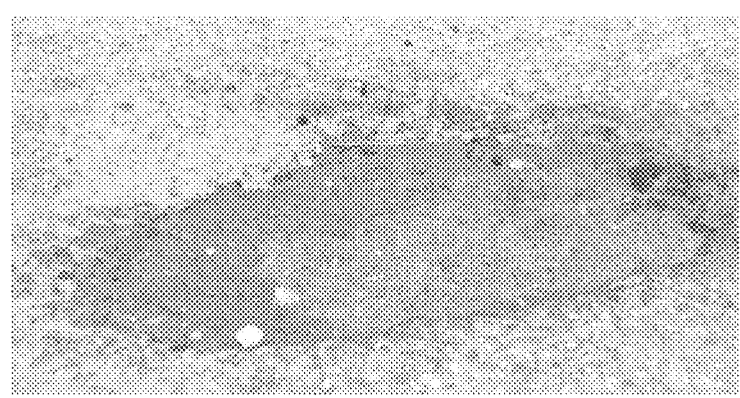
FIGS. 1A through IF are a set of photographs showing different types of pavement repair needs: potholes (FIG. 1A), delamination (FIG. 1B), slippage (FIG. 1C), raveled pavement (FIG. 1D), alligator pavement (FIG. 1E), and concrete/asphalt joints (FIG. 1F).

It should be understood that the various embodiments are not limited to the examples illustrated in the figures.

DETAILED DESCRIPTION

1. Overview

This disclosure is written to describe the invention to a person having ordinary skill in the art, who will understand that this disclosure is not limited to the specific examples or embodiments described. The examples and embodiments are single instances of the invention which will make a much larger scope apparent to the person having ordinary skill in the art. Unless defined otherwise, all technical and scientific terms used herein have the same meaning as commonly understood by the person having ordinary skill in the art. It is also to be understood that the terminology used herein is for the purpose of describing examples and embodiments only, and is not intended to be limiting, since the scope of the present disclosure will be limited only by the appended claims.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features. The examples and embodiments described herein are for illustrative purposes only and that various modifications or changes in light thereof will be suggested to the person having ordinary skill in the art and are to be included within the spirit and purview of this application. Many variations and modifications may be made to the embodiments of the disclosure without departing substantially from the spirit and principles of the disclosure. All such modifications and variations are intended to be included herein within the scope of this disclosure. For example, unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

All numeric values are herein assumed to be modified by the term "about." whether or not explicitly indicated. The term "about" generally refers to a range of numbers that one of skill in the art would consider equivalent to the recited value (for example, having the same function or result). In many instances, the term "about" may include numbers that are rounded to the nearest significant figure.

In everyday usage, indefinite articles (like "a" or "an") precede countable nouns and noncountable nouns almost never take indefinite articles. It must be noted, therefore, that, as used in this specification and in the claims that follow, the singular forms "a," "an," and "the" include plural referents unless the context clearly dictates otherwise. Thus, for example, reference to "a support" includes a plurality of supports. Particularly when a single countable noun is listed as an element in a claim, this specification will generally use a phrase such as "a single." For example. "a single support."

Unless otherwise specified, all percentages indicating the amount of a component in a composition represent a percent by weight of the component based on the total weight of the composition. The term "mol percent" or "mole percent" generally refers to the percentage that the moles of a particular component are of the total moles that are in a mixture. The sum of the mole fractions for each component in a solution is equal to 1.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

2. Definitions

Unless defined otherwise, all technical and scientific terms used herein have the same meaning as commonly understood by one of ordinary skill in the art. In addition, the terminology used herein is for the purpose of describing examples and embodiments only, and is not intended to be limiting, since the scope of the present disclosure will be limited only by the appended claims. Although various methods and materials similar or equivalent to those described herein can be used in the practice or testing of the present invention, suitable methods and materials are described below. However, the skilled artisan understands that the methods and materials used and described are examples and may not be the only ones suitable for use in the invention. Moreover, as measurements are subject to inherent variability, any temperature, weight, volume, time interval, pH, salinity, molarity or molality, range, concentration and any other measurements, quantities or numerical expressions given herein are intended to be approximate and not exact or critical figures unless expressly stated to the contrary.

As used herein, the term "about" means plus or minus 20 percent of the recited value, so that, for example, "about 0.125" means 0.125±0.025, and "about 1.0" means 1.0±0.2. The term "about 0%" refers to an amount that is not discernable or detectable by conventional assay methods or is, for example, less than about 0.01% of the composition being assayed.

In everyday usage, indefinite articles (like "a" or "an") precede countable nouns and noncountable nouns almost never take indefinite articles. It must be noted, therefore, that, as used in this specification and in the claims that follow, the singular forms "a." "an," and "the" include plural referents unless the context clearly dictates otherwise. Thus, for example, reference to "a support" includes a plurality of supports. Particularly when a single countable noun is listed as an element in a claim, this specification will generally use a phrase such as "a single." For example, "a single support."

Unless otherwise specified, all percentages indicating the amount of a component in a composition represent a percent by weight of the component based on the total weight of the composition.

"Standard temperature and pressure" generally refers to 25° C. and 1 atmosphere. Standard temperature and pressure may also be referred to as "ambient conditions." Unless indicated otherwise, parts are by weight, temperature is in ° C., and pressure is at or near atmospheric. The terms "elevated temperatures" or "high-temperatures" generally refer to temperatures of at least 100° C. Unless otherwise indicated all examples described here were formulated at standard temperature and pressure.

"Premix" refers to a composition comprising a plurality of components that may be combined or mixed in an early stage in a manufacturing and distribution process.

"Average size" refers to the particle size. The particle size of a spherical object can be unambiguously and quantitatively defined by its diameter. However, a typical material object is likely to be irregular in shape and non-spherical. There are several ways of extending the above quantitative definition to apply to non-spherical particles. Existing definitions are based on replacing a given particle with an imaginary sphere that has one of the properties identical with the particle. Volume-based particle size equals the diameter of the sphere that has the same volume as a given particle. Area-based particle size equals the diameter of the sphere that has the same surface area as a given particle. Weight-based particle size equals the diameter of the sphere that has the same weight as a given particle. Hydrodynamic or aerodynamic particle size equals the diameter of the sphere that has the same drag coefficient as a given particle.

"Mixing" or "agitation" refers to a unit operation in industrial process engineering that involves manipulation of a heterogeneous physical system with the intent to make it more homogeneous. Mixing may also be performed to allow heat and/or mass transfer to occur between one or more streams, components or phases.

"Pothole" refers to a deterioration of the pavement surface causing a steep depression. Potholes can result from water infiltration, chemical damage, or mechanical damage due to heavy traffic loads, for example, and worsened by expansion and contraction of water that infiltrates into any paved area in freeze/thaw cycles.

"Roadway" refers to any paved area, including a road, highway, shoulder, parking lot, racetrack, airport runway, driveway, sidewalks, and the like, whether paved with concrete, asphalt, or a combination thereof.

"Roadway damage" includes any damage or defect to a paved surface, such as potholes, cracking, delamination, alligator pavement, raveling, slippage/shoving, depressions, rutting, gouges, subsidence, spalled concrete, space between concrete and asphalt (concrete/asphalt joints), other gaps, and any other mechanical or chemical damage to a pavement surface. "Roadway damage" to concrete includes cracking, large chucks of concrete becoming dislodged, or spalling.

3. Embodiments of the Invention

A. Introduction

Asphalt and roadway repair compounds and formulations may have the textural, viscosity, handling, mixing, curing, pourability, workability, density, flexibility, and adherence properties desirable for easy repair of the damage and a long-lasting repair. The compounds according to this invention have all these properties, unlike the prior art repair materials. Previous compositions required application of an additional material to the damaged area or pothole for the repair material to remain solidly in the repaired area and require the damaged area to be cut out before repair or to be undercut so that merely conforming to the shape of the repaired area can prevent dislodgement of the material. In any case, water infiltration, with or without freezing and thawing, can take place because the material does not adhere well to the substrate, reducing the useful lifetime of the pavement. The repair compositions of this invention produce long-lasting repairs and unmatched durability, due to their excellent adhesive properties such that the repair compound adheres to asphalt, to concrete, to most other materials found in pavement, and to itself. In addition, the inventive products are easy to use, avoid waste, and can be prepared to have flexible cure times, including very fast cure times for rapid repairs, as well as longer times w % ben needed. Unlike prior compounds, due to the inventive products' unique adhesion properties, they are able to repair delamination, alligator pavement, slippage, raveling, or concrete/asphalt joints without the need for completely repaving the entire length of roadway. The flexibility of the inventive product allows the user to repair a variety of surfaces and defects, greatly benefitting from the products' variable cure times. Concrete repairs include cracked, areas with cracks and voids, as well as spalled concrete; all of these types of damage benefit from the unique adhesive properties of this product.

The ability to cure the compositions more quickly than the prior art is of great benefit to reduce the time it takes to make repairs to a roadway. Faster cure times allow small repairs to be made more quickly without lowering quality. Even very shallow faults in pavement can be repaired without cutting out the area to be repaired. On the other hand, when the practitioner is able to adjust the cure time, more different types of repairs can be made, including fast, small repairs and longer, larger jobs that require a longer cure time.

A small area of damage, such as a small pothole, can be repaired in only a few minutes with a fast-curing formulation (certain embodiments of the invention can be adjusted to perform with a cure time of about 5 minutes). For example, the repair material can be mixed, the polymerization initiated, and the defect filled in completely, before the material has completed curing, and within only a few minutes, the repair has been completed and cured, ready for resumption of use of the repaired area. This is faster than was possible using previous compounds and methods.

However, when a large repair is needed, such as a long crack several hundred yards in length or a large area of alligator pavement of many square yards in size, for example, a very fast cure time cannot be used because the composition will have cured before the large defect can be filled in. Thus, longer cure times are needed for larger area repairs. Unlike previous compositions for roadway repair, certain of the inventive compositions can be prepared with cure times adjusted to the size of the repair needed and the amount of time filling in the defect will take. This provides a great flexibility concerning the use of the inventive products.

Fast cures can be obtained of 5 minutes or less, suitable for quick repair of a small defect in pavement, or the cure time can be extended to 60 plus minutes. The adjustment of the cure time in products not containing NDPT may be based upon the ratio of the amounts of the binder resin and the radical initiator. The higher amount of radical initiator relative to the binder resins, the faster the cure time up to a maximum, when the radical initiator (catalyst) no longer increases the speed of the cure reaction. If temperatures are below 50° F. (or higher if a cure less than 10 minutes is desired), the radical initiator may not be sufficient. In such cases, NDPT can be added to the product. NDPT may be useful for cold weather installations, to speed up the cure time, which can be much slower at very cold temperatures. Further, where a very fast repair is needed, for example airport runway lightning strikes where the runway should be made ready for traffic as soon as possible to avoid transportation delays.

The substrates which can be repaired using embodiments of the roadway repair mixtures include asphalt, concrete, or a combination thereof, and the like. The damage and faults that can be repaired include potholes, delamination, slippage, raveling, alligator pavement, concrete/asphalt joints, or any other damage to the roadway surface. See FIG. 1. These repairs can be accomplished in most environmental conditions, but the products according to various embodiments may be used at temperatures between about 20° F. and about 90° F. The products can be used in humid or dry conditions, including in rainy or icy conditions. Any water, ice, snow, dirt, oil, grease, or any loose material inside the defect should be removed so that the inventive repair product can adhere to the base (bottom and sides) of the pavement repair area rather than to the loose material.

B. Asphalt Repair Compositions

The compositions according to embodiments of the invention include two major types of repair mixes: (1) a high quality cure-adjustable composition referred to herein as Repair Mixtures A; and (2) a high quality inexpensive, heavier duty, very sturdy and long-lasting composition referred to herein as Repair Mixtures B. Each of these types, described here, include multiple embodiments and incorporate different groups of components.

Repair Mixture A may be particularly suited for use in multiple different types of repairs to asphalt and concrete surfaces for both large and small repairs, with adjustable cure times. In general, this repair mixture may be prepared as a kit containing 23 lbs of pre-mix composition, and 28 lbs aggregate, which may be mixed to yield 51 lbs of repair product. The product may be suitable to repair potholes, delamination, slippage, raveled pavement, alligator pavement, or concrete/asphalt joints, and may be used at temperatures above 50° F. This product generally cures in about 75 minutes at 24° F., but when cooler temperatures prevail, the invention can still cure in short amounts of time that can be adjusted for faster cure times by addition of a 30 mL (about 29.5 g) vial of N,N-dimethyl-p-toluidine (NDPT; also known as N,N-4-trimethylanaline; CAS no. 99-97-8) 90-100% (available from ROEHM America, Parsippany, N.J., USA) in the kit to obtain a cure time of about 15-20 minutes. Alternatively, N,N-bis-(2-hydroxyethyl)-p-toluidine (NHPT; CAS no. 103671-44-9), can be substituted.

Repair Mixture B may be particularly suited for use in heavy duty applications where cost is a more important consideration and may, therefore, be best used for pothole repair. This composition contains increased amounts of aggregate, producing a less expensive and denser product with greater compression strength. A kit comprising this product in general contains the same components as basic Repair Mixture A (no cure time adjustment) but containing additional aggregate, for example an additional container of 21 lbs of aggregate.

C. Components of Asphalt Repair Compositions

Various embodiments of the invention can comprise a variety of materials. These materials generally include one or more binders, one or more radical initiators, one or more aggregates, one or more fillers, one or more silica sand components, and one or more rheology additives. Optionally, one or more pigments may be also included, as well as other optional components as discussed below. The compositions may be mixed together to form a compound which forms the Repair Mixture or the Repair Formulation, which can be placed inside and/or over the defect to be repaired and allowed to cure.

It will be understood by persons having ordinary skill in the art that according to various embodiments the components may be provided in the form of a kit in which certain components may be kept separate to avoid premature initiation of polymerization of the binder prior to use. For example, according to various embodiments, the binder(s), the filler(s), the silica sand(s), the pigment(s), and the rheology additive(s) generally may be premixed to form a premix composition, while the aggregate and the radical initiator may be kept isolated from the premix composition.

1. Binder Compositions

Binder compositions (also referred to as resins or binder resins) which may be contemplated for use in the invention include any suitable binder known in the art to serve the function of binding the entire composition together into a cohesive whole. Binders may be polymeric compositions usually provided in the form of monomers that may be polymerized just prior to or during use. These compositions may be selected to give the final product the desirable consistency, hardness, adhesion, durability, and flexibility, among other features.

In some embodiments, the binder may be a precursor to an acrylic polymer, for example poly(methyl methacrylate), including any suitable acrylate monomer based on the structure of acrylic acid, which consists of a vinyl group and a carboxylic acid ester end or a nitrile. Acrylate monomers contemplated for use in various embodiments include derivatives of acrylic acid, such as methyl methacrylate in which one vinyl hydrogen and the carboxylic acid hydrogen may both be replaced by methyl groups, and acrylonitrile in which the carboxylic acid group may be replaced by the related nitrile group. Examples of suitable acrylate monomers include, but are not limited to, methacrylates, methyl acrylates, ethyl acrylates, 2-chloroethyl vinyl ether, 2-ethylhexyl acrylate, hydroxyethyl methacrylate, butyl acrylate, butyl methacrylate, and trimethylolpropane triacrylate. More than one monomer can be used, to form a copolymer, if desired.

Specific binder resin monomer compositions suitable for use in the invention include acrylate and/or methacrylate resin monomers. A binder resin composition may comprise a solution of an acrylic polymer in methacrylic esters/acrylic esters, such as, for example, methyl methacrylate (for example, about 20-30% by weight) in a solution of methacrylic acid esters and/or acrylic acid esters. The binder may comprise methyl methacrylate (for example, about 20-30% by weight), n-butyl acrylate (for example, about 20-30% by weight), 2-ethylhexyl acrylate (for example, about 5-10% by weight), tributyl-O-acetylcitrate (for example, about 5-10% by weight), and N,N-bis-(2-hydroxypropyl)-p-toluidine (for example, about 0.1-1% by weight). Such a product may be available commercially. One suitable commercial example is believed to be DEGAROUTE® 485, available from Roehm America LLC of Parsippany, N.J. One or more binder resin monomers can be used in a single Repair Mix compound.

According to various embodiments, final repair formulations comprise one or more binders in a total amount within a range having a lower limit and/or an upper limit. The range can include or exclude the lower limit and/or the upper limit. The lower limit and/or upper limit can be selected from about 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15, 15.1, 15.2, 15.3, 15.4, 15.5, 15.6, 15.7, 15.8, 15.9, 16, 16.1, 16.2, 16.3, 16.4, 16.5, 16.6, 16.7, 16.8, 16.9, 17, 17.1, 17.2, 17.3, 17.4, 17.5, 17.6, 17.7, 17.8, 17.9, 18, 18.1, 18.2, 18.3, 18.4, 18.5, 18.6, 18.7, 18.8, 18.9, 19, 19.1, 19.2, 19.3, 19.4, 19.5, 19.6, 19.7, 19.8, 19.9, 20, 20.1, 20.2, 20.3, 20.4, 20.5, 20.6, 20.7, 20.8, 20.9, 21, 21.1, 21.2, 21.3, 21.4, 21.5, 21.6, 21.7, 21.8, 21.9, 22, 22.1, 22.2, 22.3, 22.4, 22.5, 22.6, 22.7, 22.8, 22.9, 23, 23.1, 23.2, 23.3, 23.4, 23.5, 23.6, 23.7, 23.8, 23.9, 24, 24.1, 24.2, 24.3, 24.4, 24.5, 24.6, 24.7, 24.8, 24.9, 25, 25.1, 25.2, 25.3, 25.4, 25.5, 25.6, 25.7, 25.8, 25.9, 26, 26.1, 26.2, 26.3, 26.4, 26.5, 26.6, 26.7, 26.8, 26.9, 27, 27.1, 27.2, 27.3, 27.4, 27.5, 27.6, 27.7, 27.8, 27.9, 28, 28.1, 28.2, 28.3, 28.4, 28.5, 28.6, 28.7, 28.8, 28.9, 29, 29.1, 29.2, 29.3, 29.4, 29.5, 29.6, 29.7, 29.8, 29.9, 30, 30.1, 30.2, 30.3, 30.4, 30.5, 30.6, 30.7, 30.8, 30.9, 31, 31.1, 31.2, 31.3, 31.4, 31.5, 31.6, 31.7, 31.8, 31.9, 32, 32.1, 32.2, 32.3, 32.4, 32.5, 32.6, 32.7, 32.8, 32.9, 33, 33.1, 33.2, 33.3, 33.4, 33.5, 33.6, 33.7, 33.8, 33.9, 34, 34.1, 34.2, 34.3, 34.4, 34.5, 34.6, 34.7, 34.8, 34.9, 35.1, 35.1, 35.2, 35.3, 35.4, 35.5, 35.6, 35.7, 35.8, 35.9, 36, 36.1, 36.2, 36.3, 36.4, 36.5, 36.6, 36.7, 36.8, 36.9, 37, 37.1, 37.2, 37.3, 37.4, 37.5, 37.6, 37.7, 37.8, 37.9, 38, 38.1, 38.2, 38.3, 38.4, 38.5, 38.6, 38.7, 38.8, 38.9, 39, 39.1, 39.2, 39.3, 39.4, 39.5, 39.6, 39.7, 39.8, 39.9, and 40 percent by weight based on the total weight of the final formulation, specifically reciting all amounts within the above-recited ranges and all ranges formed therein or thereby. For example, according to certain embodiments, a final product may comprise one or more binders in a total amount of from about 8 to about 51 wt % or from about 10 to about 18 wt % based on the total weight of the final formulation, or any combination of lower limits and upper limits described above. Cost reductions may be achieved by the formulations according to various embodiments by reducing the amount of the most expensive ingredient, the binding resin, for example, by about 50 percent.

2. Radical Initiators

The radical initiator(s) (also sometimes referred to a catalyst) useful in embodiments of the invention generally depend on the binder or binders that are chosen. The purpose of the radical initiator is to initiate polymerization of the binder resin monomers to form the binder polymer. Any radical initiator that serves this purpose is contemplated for use with the various embodiments of the invention. Persons of skill in the art are well versed in the use of such initiators. Generally, a chain-growth polymerization is initiated when one or more radical initiators are introduced to the monomer or monomers, for example an acrylate monomer. For example, methyl methacrylate undergoes a free radical vinyl polymerization to form poly(methyl methacrylate) as shown below in Scheme 1.

Scheme I

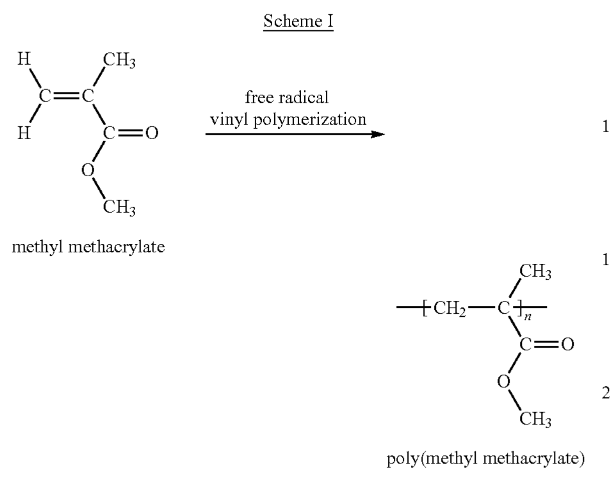

methyl methacrylate poly(methyl methacrylate)

A large number of suitable monomer precursors are commercially available. DEGAROUTE® 485, for example, may be quickly polymerized to form a methyl methacrylate resin. Radical initiators are typically sold in different strengths or concentrations in a liquid formulation, for example, in concentrations from 50% to 70%. Radical initiators are also available in powder, granule, or paste formulations. According to various embodiments, a peroxide compound such as 50% granular benzoyl peroxide (BPO) may be preferred. Examples of commercially available BPO radical initiators include but are not limited to: PERKADOX® (for example PERKADOX 45, PERKADOX 50, and/or PERKADOX 75), BENOX®, and LUPEROX®, and the like, however any suitable initiator as determined by the skilled practitioner can be used. PERKADOX® GB-50X is a free-flowing 50% peroxide formulation on a phthalate-free carrier for curing unsaturated polyester resins and (meth)acrylic resins at ambient and elevated temperatures available from NOURYON®. BENOX® is a dibenzoyl peroxide available from UNITED INITIATORS®. LUPEROX® 26 polymer initiator is available from ARKEMA®, and is useful in a very wide range of high polymer applications including LDPE/EVA or styrenics as well as acrylic coatings, copolymers, and PMMA. Approximately 100 g to 200 g of PERKADOX 45 is used with the Repair Mixture A as described above. This formulation provides excellent solubility in standard thermoset curing applications. The skilled artisan can calculate the approximate amount of peroxide initiator to use depending on the total amount of product to be made and the strength of the peroxide initiator.

The radical initiator generally is used to induce a chain-growth polymerization reaction to form the polymeric network, and can include any suitable radical initiator or combination of radical initiators, for example peroxide initiators, including but not limited to one or more of benzoyl peroxide (BPO), diacyl peroxide, dibenzoyl peroxide, or methyl ethyl ketone peroxide. More preferred radical initiators include any suitable radical initiator, including but not limited to, benzoyl peroxide, methyl ethyl ketone peroxide, and the like. Preferred radical initiators include benzoyl peroxide, as a safer alternative.

Various embodiments may employ one or more radical initiators in an amount of about 0.5 percent by weight or 0.7 percent by weight based on the total weight of the final repair formulation. More generally, a final repair formulation may comprise one or more radical initiators in a total amount of from about 0.5 to about 1.4 percent by weight based on the total weight of the final pothole formulation.

According to various embodiments, a final formulation may comprise one or more radical initiators in a total amount within a range having a lower limit and/or an upper limit. The range can include or exclude the lower limit and/or the upper limit. The lower limit and/or upper limit can be selected from about 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2, 2.05, 2.1, 2.15, 2.2, 2.25, 2.3, 2.35, 2.4, 2.45, 2.5, 2.55, 2.6, 2.65, 2.7, 2.75, 2.8, 2.85, 2.9, 2.95, 3, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, 3.95, 4, 4.05, 4.1, 4.15, 4.2, 4.25, 4.3, 4.35, 4.4, 4.45, 4.5, 4.55, 4.6, 4.65, 4.7, 4.75, 4.8, 4.85, 4.9, 4.95, 5, 5.05, 5.1, 5.15, 5.2, 5.25, 5.3, 5.35, 5.4, 5.45, 5.5, 5.55, 5.6, 5.65, 5.7, 5.75, 5.8, 5.85, 5.9, 5.95, 6, 6.05, 6.1, 6.15, 6.2, 6.25, 6.3, 6.35, 6.4, 6.45, 6.5, 6.55, 6.6, 6.65, 6.7, 6.75, 6.8, 6.85, 6.9, 6.95, and 7 percent by weight based on the total weight of the final repair formulation, specifically reciting all amounts within the above-recited ranges and all ranges formed therein or thereby. For example, according to certain embodiments, a final repair formulation may comprise one or more radical initiators in a total amount of from about 0.25 to about 1.5 wt % based on the total weight of the final pothole formulation, or any combination of lower limits and upper limits described.

3. Aggregates

Aggregates for use in embodiments of the invention may include any suitable material that matches existing road conditions and structure. Typically, an aggregate is stone or gravel, or quartz silica. Other possibilities include andesite, basalt, bauxite, diorite, dolomite, fluorspar, limestone, quartz, quartzite, silicon carbide, syenite, or a mixture thereof, and the like, or any suitable material. The aggregate material preferably is quartz silica. It is greatly preferred that the aggregate(s) are washed and dried prior to use.

Certain embodiments can incorporate a consistent size of aggregate or a blend of multiple sizes of aggregates. For example, according to various embodiments the aggregate may comprise two or more different sizes of gravel. Typical gravel sizes in the United States include, but are not limited to 4, 3.5, 3, 2.5, 2, 1.5, 1, 0.75, 0.5, 0.375, 0.1875, 0.09375, and 0.0625 inches in diameter. Aggregates for use with the invention can have any of these sizes or any other available sizes. Aggregates also are provided in ranges termed stone (about 0.375 to about 4 inches), pea stone (about 0.09375 to about 0.5 inches), and screenings (about 0.0625 to about 0.1875 inches) categories. Some overlap in these categories is to be expected due to variations in sizes. The sizes are approximate average sizes. Aggregates are also sized according to a numerical system with various numerical gradations. The stone category typically includes at least numerical gradations #1, #2, #4, #5, #57, and #67. The pea stone category typically includes at least numerical gradations #7, #8, and #89. The screenings category typically includes at least numerical gradations #9 and #10.

According to various embodiments, a combination of aggregates sizes from different categories may be employed. For example, a combination of an aggregate from the stone category and an aggregate from the screenings category may be employed. Specific examples include a combination of a 3/16" aggregate with a #10 aggregate or a #5 aggregate with a #10 aggregate. The smallest of all aggregate sizes is usually size #10, which again is also commonly known as screenings gravel. This gravel is typically around 1/8th of an inch (0.32 centimeters) in diameter, making it similar in appearance to coarse sand. Crushed stone #5 includes stone that is 1 inch or smaller in size. This material is well-suited for road and paver base and may be used according to various embodiments. A preferred size for aggregate according to certain embodiments of the invention includes 3/16"×#10 (0.187×0.0669 inches), #5×#16 (0.1318×0.0393 inches), and/or 0.111×0.020 inches aggregate sizes. As the person of skill is aware, the finer the aggregate used, the smoother the final product. Smaller aggregates, in general, are used for applications such as race tracks and airport runways, where a smooth surface texture is important or where ease of pouring and use is advantageous. For most applications, the size of aggregate chosen depends on matching the existing pavement so that the repair will blend in better and yield a better final appearance. For most applications, a 1 mm to 4 mm aggregate size is useful.

Prior to use in a formulation or kit according to various embodiments, it is greatly preferred to process the aggregate by washing and drying to remove dust or other material that can reduce adhesion of the product. Therefore, optional and preferred processing of the aggregate can include one or more of washing, screen sizing, rewashing, and rescreening. Processed aggregate preferably is substantially free of clay, silt, mica, dust, impurities, and any foreign matter.

Various embodiments may employ one or more aggregates in an amount of about 54 percent by weight or about 67 percent by weight based on the total weight of the final pothole repair formulation. More generally, a final repair formulation may comprise one or more aggregates in a total amount of from about 0 percent by weight to about 77 percent by weight based on the total weight of the final repair formulation. According to various embodiments, a final formulation may comprise one or more aggregates in a total amount within a range having a lower limit and/or an upper limit. The range can include or exclude the lower limit and/or the upper limit. The lower limit and/or upper limit can be selected from about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, and 60 wt % based on the total weight of the final repair formulation. For example, according to certain embodiments, a final formulation may comprise no aggregate, or may comprise one or more aggregates in a total amount of from about 40 percent by weight to about 77 percent by weight based on the total weight of the final pothole formulation, or any combination of lower limits and upper limits described.

4. Fillers

According to various embodiments, one or more fillers may be included in the compound. Fillers preferably comprise calcium carbonate ($CaCO_3$), titanium dioxide ($TiO_2$), and/or mini-fibers such as polyolefin pulp, fumed silica or cellulosic fibers. A preferred composition is SHORT STUFFS, a highly fibrillated high density polyethylene. A second preferred example of a filler according to various embodiments is Oyma SNOW WHITE®, a dry ground calcium carbonate which comprises pulverized and ground limestone having a median diameter of about 12 μm. The filler may additionally or alternatively comprise carbon or glass fibers. Other suitable fillers are known in the art and can be purchased from commercial suppliers such as Brenntag™, Kraft™, Cereuse™, Boxnutra™, Scora™, and the like. Fillers are optional, or may comprise additional silica sand added to the product as discussed below.

Without wishing to be bound by theory it is believed that such a filler may balance the color of the final pothole repair formulation, add bulk and stabilization to the mixture, while also giving customers more pothole-filling bulk with less cost. Thus, any fillers suitable for this purpose can be used as deemed convenient by the practitioner or the filler may be omitted.

Various embodiments may employ one or more fillers in an amount of about 12 wt % or about 16.7 wt % based on the total weight of the final repair formulation. More generally, a final repair formulation may comprise one or more fillers in a total amount of from about 0 percent by weight or from about 6 percent by weight to about 33 percent by weight based on the total weight of the final formulation. According to various embodiments, a final repair formulation may comprise one or more fillers in a total amount within a range having a lower limit and/or an upper limit. The range can include or exclude the lower limit and/or the upper limit. The lower limit and/or upper limit can be selected from about 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, and 33 percent by weight based on the total weight of the final formulation, specifically reciting all amounts within the above-recited ranges and all ranges formed therein or thereby. For example, according to certain embodiments, a final formulation may comprise one or more fillers in a total amount of from about 8 to about 20 wt % based on the total weight of the final repair formulation, or any combination of lower limits and upper limits described.

5. Silica Sand

Silica sand, also known as quartz sand, white sand, or industrial sand, may be included as a component of the repair compositions. Silica sand generally is made up of silicon dioxide ($SiO_2$), which potentially is a respirable dust. Therefore, according to various embodiments, the silica sand optionally is a resin-encapsulated silica sand (resin-coated sand, RCS) such as the commercially available PERMACOLOR® Quartz Aggregate available from Clifford W. Estes Co. Inc. The encapsulation of the silica sand should capture the dust and should, under normal circumstances, prevent any normal release of silica dust. Thus, the silica sand used in certain various embodiments of the invention can comprise about 94 percent silica sand (about 0.0232"×about 0.0117" or about 0.590 mm×about 0.290 mm), about 4.95 percent resin, about 0.99 percent $TiO_2$, and about 0.06 percent of inorganic colorants. This composition is commercially available. Without wishing to be bound by theory it is believed that the silica sand adds strength, volume, and weight to the final pothole repair formulation, as well as adjusting the hardness and workability of the product.

The particular sand used in preferred embodiments for Repair Mixture A and Repair Mixture B include any commercially available resin coated sand (RCS). For example, PERMACOLOR® (Estes), CUSTOM COAT®, (HA Industries), SHELL FASTULTRA® (Midvale Industries), TECHISAND® (Govia or Smelko), and the like. The sand has a preferred average size of about 0.0232"×about 0.0117" or about 0.590 mm×about 0.290 mm.

More generally, a final repair formulation may comprise silica sand in an amount of from about 6 to about 26 percent by weight based on the total weight of the final formulation. According to various embodiments, a final pothole formulation may comprise silica sand in an amount within a range having a lower limit and/or an upper limit. The range can include or exclude the lower limit and/or the upper limit. The lower limit and/or upper limit can be selected from about 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, and 26 percent by weight based on the total weight of the final repair formulation, specifically reciting all amounts within the above-recited ranges and all ranges formed therein or thereby. For example, according to certain embodiments, a final formulation may comprise silica sand in an amount of about 9.2 percent by weight or about 12.8 percent by weight based on the total weight of the final formulation, or any combination of lower limits and upper limits described. Various embodiments also can employ silica ($SiO_2$) sand in an amount of about 10 percent by weight based on the total weight of the final pothole repair formulation.

6. Rheology Additives

Rheology additives also form a part of the formulation of Repair Mixes and compositions according to embodiments of the invention. These compositions change the deformation and flow of the material to improve the workability of the composition and provide for more ease of use. The additive creates highly thixotropic flow behavior and consequently improves the anti-sagging and anti-settling properties of the finished product. Any suitable rheology agent can be chosen by the person of skill, but commercially available rheology additives include but are not limited to RHEOBYK-410 and BENTONE® 27. RHEOBYK-410 is a liquid rheology additive for medium-polarity solvent-borne and solvent-free coating systems as well as PVC plastisols and ambient-curing resin systems. This compound is a modified urea composition in a solution of N-methylpyrrolidon. BENTONE® 27 is an organic derivative of hectorite clay. Preferred embodiments of the invention include the rheology additive, RHEOBYK-410 (which is sold as a 52% solution in N-methylpyrrolidon) and/or BENTONE 27.

Various embodiments may employ one or more rheology additives in an amount of about 0.07 percent by weight or about 0.1 percent by weight (for example of a 52% solution) based on the total weight of the final repair formulation, which should be mixed well into the composition. More generally, a final formulation may comprise one or more rheology additives in a total amount of from about 0.05 percent by weight to about 0.82 percent by weight (for example, of a 52% solution) based on the total weight of the final formulation. According to various embodiments, a final formulation may comprise one or more rheology additives within a range having a lower limit and/or an upper limit. The range can include or exclude the lower limit and/or the upper limit. The lower limit and/or upper limit can be selected from about 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, and 1 percent by weight based on the total weight of the final repair formulation, specifically reciting all amounts within the above-recited ranges and all ranges formed therein or thereby. For example, according to certain embodiments, a final formulation may comprise one or more rheology additives in a total amount of from about 0.1 to about 0.7 percent by weight based on the total weight of the final formulation, or any combination of lower limits and upper limits described.

7. Curing Time Adjustment

N, N-dimethyl-p-toluidine (N, N, 4-trimethylanaline) 90-100% may be added to the pre-mix in order to speed the cure time in cold or in warmer weather. As an example, for a product having a cure time of about 75 minutes, about 30 mL (about 1 fluid ounce) of the solution can be added to about 51 pounds of Repair Mix A pre-mix or about 60 mL of the solution can be added to Repair Mix B pre-mix to reduce the cure time to about 18-20 minutes at 24° F. air temperature. See Example 3, below, for some additional examples of approximate cure time adjustments.

8. Optional Components

The final product may contain inert ingredients, solvents, and/or minor contaminants present inherently in any of the components of the product, in particular solvents, preservatives, and the like. Certain embodiments of the invention also optionally contain additional components such as additional viscosity modifiers, odor controllers, pH modifiers, solvents, pigments, and the like, in small amounts. These small amounts preferably are less than about 3% by weight, less than about 1% by weight, less than about 0.5% by weight, less than about 0.1% by weight, less than about 0.01% by weight, or not detectable, specifically reciting all amounts within the above-recited ranges and all ranges formed therein or thereby.

The inventive repair compositions can be colored with almost any color to match the existing pavement, for example neutral (no color), black (for asphalt), brown or beige (for sidewalks or concrete), yellow, brick red, and the like. The color can be added using any desired dry pigments, which is/are added to the premix.

Pigments are added to the compositions according to various embodiments of the invention, and include, for example, inorganic iron oxide (i.e., micronized iron oxide black pigment such as BAYFERROX® 318 NM, molar weight 231.6 or other colored pigment compositions), and the like, which can provide color and also assist in stability of the pothole repair formulation. Such pigments are available from a variety of commercial suppliers including BAYFERROX®, HOOVER®, CATHAY®.

Various embodiments may employ one or more pigments in an amount of about 0.2 wt % or about 0.3 wt % based on the total weight of the final repair formulation. More generally, a final formulation may comprise one or more pigments in a total amount of from about 0 wt % to about 1.1 wt % based on the total weight of the final formulation. According to various embodiments, a final repair formulation may comprise one or more pigments in a total amount within a range having a lower limit and/or an upper limit. The range can include or exclude the lower limit and/or the upper limit. The lower limit and/or upper limit can be selected from about 0, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, and 1.1 percent by weight based on the total weight of the final formulation, specifically reciting all amounts within the above-recited ranges and all ranges formed therein or thereby. For example, according to certain embodiments, a final repair formulation may comprise one or more pigments in a total amount of from about 0.05 wt % to about 0.4 wt % based on the total weight of the final formulation, or any combination of lower limits and upper limits described.

D. Premix Compounds

As already discussed, various embodiments relate to a premix composition which comprises all of the ingredients of the repair formulations according to various embodiments except for the one or more aggregates, the one or more radical initiators, and the optional NDPT, which should be kept separate from the premix composition until immediately prior to use.

Thus, according to various embodiments, a premix composition may comprise a binder compound (monomers), a filler, a silica sand, a pigment, and a rheology additive, which may have the same compositions and characteristics as already described with respect to the final formulation. A preferred premix composition may comprise about 34 wt % of one or more binder solution; about 37 wt % of one or more fillers, about 9.2 wt % to about 28 wt % of a silica sand, about 0.75 wt % of one or more pigments, and about 0.22 wt % of one or more rheology additives, with all weight percentages being based on the total weight of the premix composition (alone without respect to the aggregate and the radical initiator/catalyst), specifically reciting all increments of 0.1 wt % within the above-recited ranges and all ranges formed therein or thereby. A preferred Repair Product A contains about 40 to about 45% premix composition, about 50 to about 55% aggregate, about 0.68% radical initiator, optionally with the addition of NDPT as discussed herein, specifically reciting all increments of 0.1 wt % within the above-recited ranges and all ranges formed therein or thereby.

The premix composition comprises one or more binder compositions, for example DEGAROUTE 485, in an amount within a range having a lower limit and/or an upper limit. The range can include or exclude the lower limit and/or the upper limit. The lower limit and/or upper limit can be selected from about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 percent by weight based on the total weight of the premix composition, specifically reciting all amounts within the above-recited ranges and all ranges formed therein or thereby. For example, according to certain embodiments, the premix composition may comprise one or more binders in an amount of about 25 percent by weight to about 51 percent by weight based on the total weight of the premix composition, or any combination of lower limits and upper limits described above. A preferred embodiment of the premix comprises about 28% by weight to about 45% by weight binder resin solution in the premix, more preferably about 30% by weight to about 40% by weight binder resin solution in the premix, even more preferably about 35% by weight to about 40% by weight binder solution in the premix, and most preferably about 37% by weight binder resin in the premix.

The premix composition may comprise one or more fillers in an amount within a range having a lower limit and/or an upper limit. The range can include or exclude the lower limit and/or the upper limit. The lower limit and/or upper limit can be selected from about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 percent by weight based on the total weight of the premix composition, specifically reciting all amounts within the above-recited ranges and all ranges formed therein or thereby. For example, according to certain embodiments, the premix composition may comprise one or more fillers in an amount of about 18% by weight to about 74% by weight based on the total weight of the premix composition, or any combination of lower limits and upper limits described. A preferred embodiment of the invention comprises about 0% to about 74% by weight filler in the premix, more preferably about 18% by weight to about 50% by weight in the premix, even more preferably about 20% by weight to about 60% by weight in the premix, and most preferably about 25% by weight to about 40% by weight in the premix. For example, one embodiment comprises 37.6% by weight filler components in the premix.

The premix composition may comprise silica sand, such as a resin-encapsulated silica sand, in an amount within a range having a lower limit and/or an upper limit. The range can include or exclude the lower limit and/or the upper limit. The lower limit and/or upper limit can be selected from about 10, 11, 12, 13, 14, 15, 16, 17, 18, 19, 20, 21, 22, 23, 24, 25, 26, 27, 28, 29, and 30 percent by weight based on the total weight of the premix composition, specifically reciting all amounts within the above-recited ranges and all ranges formed therein or thereby. For example, according to certain embodiments, the premix composition may comprise silica sand, such as a resin-encapsulated silica sand, in an amount of about 9.2% by weight to about 57% by weight based on the total weight of the premix composition, or any combination of lower limits and upper limits described. A preferred embodiment of the invention comprises about 0% to about 60% by weight silica sand in the premix, more preferably about 5% by weight to about 57% by weight in the premix, even more preferably about 8% by weight to about 45% by weight in the premix, and most preferably about 9% by weight to about 29% by weight in the premix. For example, one embodiment comprises 28% by weight or 28.9% by weight silica sand components in the premix.

The premix composition may comprise one or more pigments in an amount within a range having a lower limit and/or an upper limit. The range can include or exclude the lower limit and/or the upper limit. The lower limit and/or upper limit can be selected from about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, and 1 percent by weight based on the total weight of the premix composition, specifically reciting all amounts within the above-recited ranges and all ranges formed therein or thereby. For example, according to certain embodiments, the premix composition may comprise one or more pigments in an amount of about 0% by weight to about 2.25% by weight based on the total weight of the premix composition, or any combination of lower limits and upper limits described.

The premix composition may comprise one or more rheology additives in an amount within a range having a lower limit and/or an upper limit. The range can include or exclude the lower limit and/or the upper limit. The lower limit and/or upper limit can be selected from about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, and 1.5 percent by weight based on the total weight of the premix composition, specifically reciting all amounts within the above-recited ranges and all ranges formed therein or thereby. For example, according to certain embodiments, the premix composition may comprise one or more rheology additives in an amount of about 0% to about 2% by weight based on the total weight of the premix composition, or any combination of lower limits and upper limits described. A preferred embodiment of the invention comprises about 0.1% by weight to about 1.5% by weight rheology additive in the premix, more preferably about 0.2% by weight to about 1% by weight in the premix, even more preferably about 0.2% by weight to about 0.5% by weight in the premix, and most preferably about 0.2% to about 0.45% by weight in the premix. For example, one embodiment comprises 0.22% by weight or about 0.44% by weight rheology additive components in the premix.

The aggregate and radical initiator components, as well as the optional NDPT of the final product are kept separate from the premix discussed above. According to various embodiments the aggregate and the radical initiator may be combined into a single packet or container as a second composition, as long as the radical initiator is kept separate from the binder monomers to prevent premature polymerization and from the NDPT, if present. According to various embodiments it is desirable to keep the aggregate and the radical initiator components separate from each other to allow for easier preparation of partial batches of final product from one batch or kit. It is difficult to ensure even distribution of the aggregate and the radical initiator when these components are premixed, therefore, a kit that included a premixed packet of aggregate and radical initiator should be made all at once in a single batch and could not easily be divided into smaller batches. The inventive products and kits are packaged together as three parts: (A) Pre-Mix, (B) Aggregate, and (C) radical initiator, and optionally (D) NDPT. The components are kept separate because the premix and the radical initiator should be thoroughly mixed prior to addition of the aggregate to ensure this component is evenly distributed into the premix. If the aggregate is added to the premix first, this makes mixing in the radical initiator much more difficult due to the added resistance of the mixture with the aggregate.

E. Repair Product Mixture B

As discussed herein, the asphalt repair compositions generally are provided as a premix, which contains all components with the exception of the aggregate and the radical initiator, and a separate container or containers that contain the other two components. The components are provided as a weight percentage of the total composition as mixed for repair of the damaged asphalt. The Repair Mixture B final product compositions contain about 8 wt % to about 17 wt % of one or more binder resin solution, about 6 wt % to about 24 wt % of one or more fillers, about 9 wt % to about 18.5 wt % silica sand, about 0.05 wt % to about 0.6 wt % of one or more rheology additives, about 0.5 wt % to about 1 wt % radical initiators, about 40 wt % to about 77 wt % aggregates, and about 0.2 wt % to about 0.8 wt % optional components such as pigment or other additives, specifically reciting all increments of 0.1 wt % within the above-recited ranges and all ranges formed therein or thereby.

The binders can comprise about 9 wt % to about 15 wt % or more preferably about 10 wt % to about 12 wt % of the total composition and most preferably about 11 wt % of the total composition, specifically reciting all increments of 0.1 wt % within the above-recited ranges and all ranges formed therein or thereby. The fillers can comprise about 8 wt % to about 20 wt % or more preferably about 10 wt % to about 15 wt % of the total composition and most preferably about 12 wt % of the total composition, specifically reciting all increments of 0.1 wt % within the above-recited ranges and all ranges formed therein or thereby. The silica sand can comprise about 9 wt % to about 15 wt % or more preferably about 9 wt % to about 10 wt % of the total composition and most preferably about 9.2 wt % of the total composition, specifically reciting all increments of 0.1 wt % within the above-recited ranges and all ranges formed therein or thereby. The rheology additives can comprise about 0.05 wt % to about 0.5 wt % or more preferably about 0.06 wt % to about 0.1 wt % of the total composition and most preferably about 0.07 wt % of the total composition, specifically reciting all increments of 0.1 wt % within the above-recited ranges and all ranges formed therein or thereby. The radical initiators can comprise about 0.5 wt % to about 0.8 wt % or more preferably about 0.5 wt % to about 0.7 wt % of the total composition and most preferably about 0.5 wt % of the total composition, specifically reciting all increments of 0.1 wt % within the above-recited ranges and all ranges formed therein or thereby. The aggregates can comprise about 45 wt % to about 70 wt % or more preferably about 50 wt % to about 50 wt % of the total composition and most preferably about 66.8 wt % of the total composition, specifically reciting all increments of 0.1 wt % within the above-recited ranges and all ranges formed therein or thereby. The pigments can comprise about 0 to about 0.75 wt % or more preferably about 0.2 wt % to about 0.3 wt % of the total composition and most preferably about 0.24% of the total composition, specifically reciting all increments of 0.1 wt % within the above-recited ranges and all ranges formed therein or thereby.

Preferred binders for use in the Repair Mixture B formulations include but are not limited to acrylate/methacrylate resins such as DEGAROUTE 485. Preferred fillers for use in the Repair Mixture B formulations include but are not limited to calcium carbonate. Preferred silica sands for use in the Repair Mixture B formulations include but are not limited to resin coated silica sand (RSC). Preferred rheology additives for use in the Repair Mixture B formulations include but are not limited to modified urea compounds such as RHEOBYK-410. Preferred aggregates for use in the Repair Mixture B formulations include but are not limited to quartz silica. Preferred pigments, when present, for use in the Repair Mixture B formulations include but are not limited to micronized iron oxide black pigment.

Substrates which advantageously can be repaired using the Repair Mixture B mixture include asphalt, concrete, brick, pavers, any common road and sidewalk materials, and the like. Repair Mixture B products are designed preferably for use in pothole repair.

F. Repair Mixture A.

As discussed herein, the asphalt repair compositions generally are provided as a premix, which contains all components with the exception of the aggregate and the radical initiator, and a separate container or containers that contain the other two components. The components are provided as a weight percentage of the total composition as mixed for repair of the damaged asphalt. The Repair Mixture A final product compositions contain about 12 wt % to about 23 wt % of one or more binders (for example of a 20%-30% solution), about 8 wt % to about 33 wt % of one or more fillers, about 6 wt % to about 26 wt % silica sand, about 0.1 wt % to about 0.82 wt % of one or more rheology additives, about 0.65 wt % to about 1.4 wt % radical initiators, about 0 wt % to about 65 wt % aggregates, and about 0 wt % to about 1.2 wt % optional components such as pigment or other additives, specifically reciting all increments of 0.1 wt % within the above-recited ranges and all ranges formed therein or thereby.

The binders components can comprise about 13 wt % to about 20 wt % or more, preferably about 14 wt % to about 18 wt % of the total composition and most preferably about 15.4 wt % of the total composition, specifically reciting all increments of 0.1 wt % within the above-recited ranges and all ranges formed therein or thereby. The fillers can comprise about 10 wt % to about 25 wt % or more preferably about 15 wt % to about 20 wt % of the total composition and most preferably 16.7 wt % of the total composition, specifically reciting all increments of 0.1 wt % within the above-recited ranges and all ranges formed therein or thereby. The silica sand can comprise about 9 wt % to about 30 wt % or more preferably about 10 wt % to about 20 wt % of the total composition and most preferably about 12.8 wt % of the total composition, specifically reciting all increments of 0.1 wt % within the above-recited ranges and all ranges formed therein or thereby. The rheology additives can comprise about 0.1 wt % to about 0.75 wt % or more preferably about 0.1 wt % to about 0.5 wt % of the total composition and most preferably about 0.1 wt % of the total composition, specifically reciting all increments of 0.1 wt % within the above-recited ranges and all ranges formed therein or thereby. The radical initiators can comprise about 0.7 wt % to about 1 wt % or more preferably about 0.6 wt % to about 0.8 wt % of the total composition and most preferably about 0.7 wt %, specifically reciting all increments of 0.1 wt % within the above-recited ranges and all ranges formed therein or thereby. The aggregates can comprise about 10 wt % to about 60 wt % or more preferably about 20 wt % to about 55 wt % of the total composition and most preferably about 54 wt %, specifically reciting all increments of 0.1 wt % within the above-recited ranges and all ranges formed therein or thereby. The pigments can comprise about 0 wt % to about 1 wt % or more preferably about 0.2 wt % to about 0.75 wt % of the total composition and most preferably about 0.3 wt % of the total composition, specifically reciting all increments of 0.1 wt % within the above-recited ranges and all ranges formed therein or thereby.

TABLE 1

Example Road Repair Mixture A Products.

| Component | Minimum | Maximum | Most Highly Preferred |
|---|---|---|---|
| DEGAROUTE 485 | 2721.54 g | 7257.44 g | 3628.72 g |
| BYK 410 | 24 g | 144 g | 24 g |
| Benzoyl peroxide | 80 g | 320 g | 160 g |
| Pigment | 0 | 240 g | 80 g |
| SNOW WHITE 12 PT | 0 | 4905 g | 3924 g |
| RSC | 0 | 3770 g | 3016 g |
| Aggregate | 0 | 25,400 g | 12701 g |
| NDPT | 0 | 60 mL | 30 mL |

Preferred binders for use in the Repair Mixture A formulations include but are not limited to acrylate/methacrylate resins such as DEGAROUTE 485. Preferred fillers for use in the Repair Mixture A formulations include but are not limited to calcium carbonate. Preferred silica sands for use in the Repair Mixture A formulations include but are not limited to resin coated silica sand. Preferred rheology additives for use in the Repair Mixture A formulations include but are not limited to modified urea compounds such as RHEOBYK-410. Preferred aggregates for use in the Repair Mixture A formulations include but are not limited to quartz silica. Preferred pigments, when present, for use in the Repair Mixture A formulations include but are not limited to micronized iron oxide black pigment.

Substrates which advantageously can be repaired using the Repair Mixture A mixture include asphalt, concrete, steel, wood, brick, pavers, gravel, granite, and the like. Repair Mixture A products are designed for the following uses: pothole repair, repair of delamination, repair of alligator pavement, repair of slippage, repair of raveling and repair of concrete/asphalt joints.

G. Kits

In certain embodiments, the repair products are provided as a kit with a container of a premix composition and separate containers of an aggregate composition and a radical initiator. Kits containing about 18 to about 27 pounds of a premix and about 20 to about 36 pounds of aggregate composition in a separate container, and about 0.30 to about 0.41 pounds of one or more radical initiator in another separate container are provided together. A kit containing about 23 pounds of premix and about 28 pounds of aggregate, when prepared, results in about 1.1 cubic feet of compound for repair. The person of skill is readily able to discern how much of the product would be necessary for any particular repair project. Kits therefore can be adjusted in size or purchased in multiples.

For convenience, kits can be provided in the form of a container for shaking and pouring into a small defect in pavement, referred to as Shaker Kits. These kits are suitable for repairing small pavement defects such as the core samples routinely taken when road construction or major overlaying to validate the roadway conforms to standards. It is common practice to take a six-inch core sample about 6-12 inches deep to analyze the newly installed pavement, but producing a hole in the new pavement. Usually, these are filled with the cold patch method, discussed above. In addition, airport runways often are struck by lightning, which can create a small crater or craters that need to be repaired quickly before continued use. This embodiment is contemplated for use with any small repairs to pavement.

Figure 3:
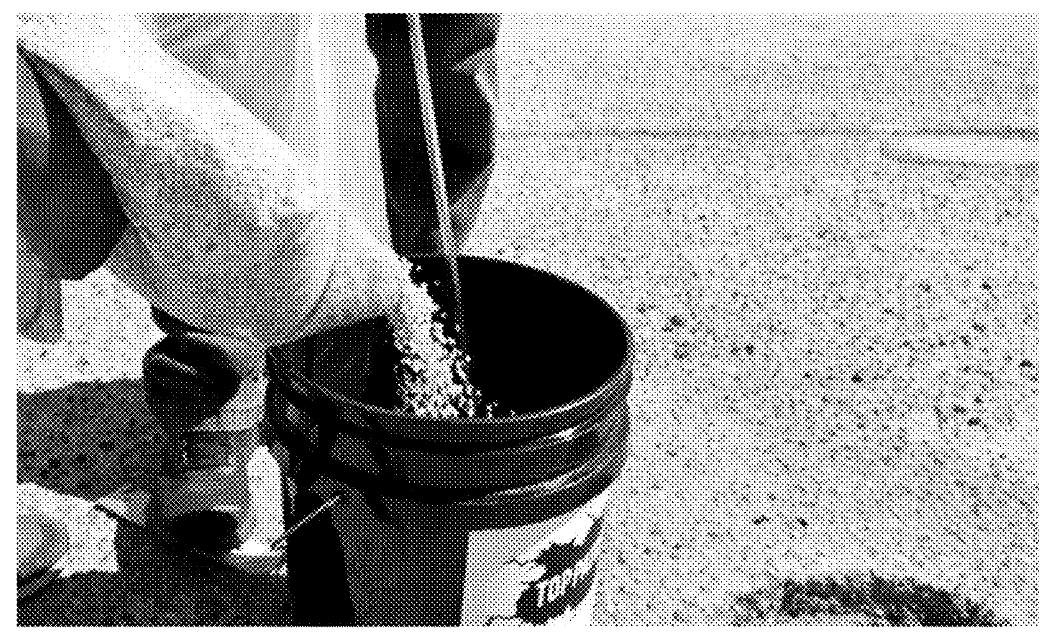
FIG. 3 is a diagram showing a “shaker kit” embodiment of the invention.

The Shaker Kits contemplated as part of this invention allow a fast repair of such small defects with a short cure time. Such kits comprise a shaker jar 100 comprising a container 110 with a removable and resealable lid 120, and a capacity of about 1-3 liters. The container is configured to contain the pre-mix material 202 and aggregate 201, with air space enough inside the container to shake the materials inside for mixing. A separate container is provided containing the radical initiator, and optionally a second separate container for the optional NDPT. The radical initiator and NDPR are added to the shaker jar container 110 separately by the end user, immediately before use. The contents are shaken well, the lid is removed, and the contents are poured into the pavement defect to be repaired. See FIG. 3.

H. Methods of Preparation/Use

A premix composition is prepared by simple addition of the components in a container such as a bucket, a barrel, pail, or any suitable container, followed by mixing. See Example 5.

Prior to use, the premix preferably is agitated or mixed again in case of settling during transport and to ensure even distribution of the components in the premix. Mixing or agitation advantageously is performed with a drill having an agitation blade attached. The radical initiator then is added to the premix composition, and mixed together. Upon adding the radical initiator, the polymerization will begin, and it is therefore important to proceed quickly, noting the expected cure time of the product. Thus, the initiator preferably is added at the job site near where the repair is to be made. Next, the aggregate (and optionally pigment as well) is added and mixed or agitated. Finally, the resulting pothole repair formulation is poured into a pothole or other defect, smoothed, and allowed to cure. As the chain-growth polymerization reaction proceeds, the polymeric network locks the aggregate into place and provides a rigid structure to successfully fill the pothole. Multilayer fills can be performed with the inventive products. Because the inventive product adheres to itself, if insufficient product is prepared for the repair to be made, a second batch can be prepared after the first has cured and used to fill in the remainder of the defect.

The damaged substrate to be repaired is prepared as follows. If a pothole or other area with loose material is to be repaired, all of the loose rubble, sand, dirt, and the like are removed. It is not necessary to remove all water or to undercut the damaged area.

I. Some Exemplary Benefits and Advantages of Various Embodiments

Benefits of the formulations according to various embodiments include but are not limited to reduced cost, improved texture, improved pourability, easier mixing, adhesion to different substrates (including both concrete and asphalt), and pigmentation adapted to blend-in to existing roadways. Improved texture, pourability, and easier mixing can be achieved by the formulations according to various embodiments discussed here which can make the formulations appear like, flow like, and mix like the hot mix asphalts that are used to pave roads already. The products therefore are more acceptable for road crews because the products are more familiar and are used in a similar manner to other products with which they are familiar. In addition, the improved mixability and flow allows the formulations to be mixed with lighter duty mixing equipment. The size of the containers, coupled with the unique adhesion properties and especially the adjustable cure time, make the invention a stand-alone product that can be used by professionals on pavement trucks as well as maintenance & repair departments for any company or business, or individual owned property to do pavement repairs of professional quality and durability, without spending many thousands of dollars to have hot mix trucks arrive at their property for repairs.

Additional advantages of the products discussed here are the ability to adhere to surfaces of the damaged pavement, including both asphalt and concrete, without separate pretreatment with an adhesive. They also have very good stress adhesion. This allows one to repair or seal gaps in concrete/asphalt joints, or any cracks, which prior products have not been able to accomplish with a smooth and long-lasting repair, with minimal water infiltration. Further, the inventive products are stronger than normal crack sealer often used for cracks in roadways, parking lots, or sidewalks. The products also are self-leveling to a great extent, do not need to be mounded and can be prepared with different cure times so that both small and large projects can be done within the span of time needed for cure. In addition, due to its unique formulation and adhesion properties, can successfully repair areas as little as ¼ inch deep (standard aggregate) ⅛ inch deep aggregate.

3. EXAMPLES

This invention is not limited to the particular processes, compositions, or methodologies described, as these may vary. The terminology used in the description is for the purpose of describing the particular versions or embodiments only, and is not intended to limit the scope of the present invention which will be limited only by the appended claims. Although any methods and materials similar or equivalent to those described herein can be used in the practice or testing of embodiments of the present invention, the preferred methods, devices, and materials are now described. The following examples are put forth to provide those of ordinary skill in the art with a complete disclosure and description of how to perform the methods, how to make, and how to use the compositions and compounds disclosed and claimed herein. Efforts have been made to ensure accuracy with respect to numbers (e.g., amounts, temperature, etc.), but some errors and deviations should be accounted for. The purpose of the following examples is not to limit the scope of the various embodiments, but merely to provide examples illustrating specific embodiments.

Example 1: Repair Mixture B

The components in a premix for Repair Mixture B include those in Table 2, below. The weight percentages used throughout are amounts by weight percent based on the total weight of the final repair formulation.

TABLE 2

Example and Preferred Repair Mixture B Components[a].

| | Repair Composition | | | | | | | Time to Cure (min) and |
|---|---|---|---|---|---|---|---|---|
| Example | Binder | Filler | Silica Sand | Rheology Additive | Pigment | Radical Initiator | Aggregate | Temperature (° F.) |
| B1 | 3629 g DEGAROUTE 485 | 3924 g SNOW WHITE 12 PT | 3016 g RCS | 24 g BYK-410 | 80 g inorganic iron oxide | 160 g benzoyl peroxide | 21,827 g quartz silica | 19 minutes 88° F. |
| B2 | 3629 g DEGAROUTE 485 | 3924 g SNOW SHITE | 3016 g RCS | 24 g BYK-410 | 80 g inorganic iron oxide | 160 g benzoyl peroxide | 21,827 g quartz silica | 23 minutes 78° F. |
| B3 | 3629 g DEGARGUTE 485 | 3924 g SNOW WHITE | 3016 g RCS | 24 g BYK-410 | 80 g inorganic iron oxide | 160 g benzoyl peroxide | 21,827 g quartz silica | 23 minutes 78° F. |
| B4[b] | 3629 g DEGAROUTE 485 | 3924 g SNOW WHITE | 3016 g RCS | 24 g BYK-410 | 80 g inorganic iron oxide | 320 g benzoyl peroxide | 21827 g quartz silica | 24 minutes 39° F. |

[a]indicates used to fill large pothole;

[b]indicates includes 56 g NDPT.

Example 2: Repair Mixture A

The components in a premix for Repair Mixture A include those in Table 3, below. The weight percentages used throughout are amounts by weight percent based on the total weight of the final repair formulation. The products were used to complete repairs as indicated in the table, and the cure time/temperature was recorded.

TABLE 3

Example Repair Mixture A Components.

| Example | Binder | Filler | Silica Sand | Rheology Additive | Pigment | Radical Initiator | Aggregate | Time to Cure (min) and Temperature (° F.) |
|---|---|---|---|---|---|---|---|---|
| | Repair Composition | | | | | | | |
| A1[a] | 3629 g DEGAROUTE 485 | 3924 g SNOW WHITE 12 PT | 3016 g RCS | 24 g BYK-410 | 80 g inorganic iron oxide | 160 g benzoyl peroxide | 12700 g quartz silica | 21 minutes 75° F. |
| A2[b] | 3629 g DEGAROUTE 485 | 3924 g SNOW WHITE | 3016 g RCS | 24 g BYK-410 | 80 g inorganic iron oxide | 160 g benzoyl peroxide | 12700 g quartz silica | 21 minutes 87° F. |
| A3[c] | 3629 g DEGAROUTE 485 | 3924 g SNOW WHITE | 3016 g RCS | 24 g BYK-410 | 80 g inorganic iron oxide | 160 g benzoyl peroxide | 12700 g quartz silica | 25 minutes 81° F. |
| A4[d] | 3629 g DEGAROUTE 485 | 3924 g SNOW WHITE | 3016 g RCS | 24 g BYK-410 | 120 g GRAY | 160 g benzoyl peroxide | 12700 g quartz silica | 21 minutes 89° F. |
| A5[b] | 3629 g DEGAROUTE 485 | 3924 g SNOW WHITE | 3016 g RCS | 24 g BYK-410 | 80 g inorganic iron oxide | 160 g benzoyl peroxide | 8500 g quartz silica | 18 minutes 86° F. |
| A6[e] | 3629 g DEGAROUTE 485 | 3924 g SNOW WHITE | 3016 g RCS | 24 g BYK-410 | 80 g inorganic iron oxide | 240 g benzoyl peroxide | 12.700 g quartz silica | 25 minutes 35° F. |
| A7[e*] | 3629 g DEGAROUTE 485 | 3924 g SNOW WHITE | 3016 g RCS | 24 g BYK-410 | 80 g inorganic iron oxide | 160 g benzoyl peroxide | 12700 g quartz silica | 23 minutes 28° F. |
| A8[f] | 3629 g DEGAROUTE 485 | 3924 g SNOW WHITE | 3016 g RCS | 24 g BYK-410 | 80 g inorganic iron oxide | 160 g benzoyl peroxide | 12700 g quartz silica | 79 minutes 24° F. |

[a]indicates delamination repair;
[b]indicates alligator pavement repair;
[c]indicates slippage repair;
[d]indicates sidewalk linear crack repair;
[e]indicates potbole repair;
[f]indicates delamination and alligator pavement repair.
*indicates addition of 28 g NDPT.

Example 3: Adjustment of Cure Time

Example Repair Composition A8 as described in Table 3 was tested for curing performance at 24° F. air temperature and 16° F. road temperature. With no NDPT, the curing time was approximately 75 minutes. Adding 30 mL to a 51 lb batch of the Repair Mix A product resulted in a cure time of approximately 20-24 minutes under the same conditions. See Table 3, example A7. Preferably, the NDPT is added kept separate in a separate container and added after the radical initiator has been added. See Table 4, below.

In products and kits with optional faster cure times, NDPT is included as part of the product, in a separate vial, or small plastic bottle containing about 1 mL NDPT. The user mixes the premix thoroughly, for example with an "eggbeater" mixing paddle and drill for about 1 minute, then adds the NDPT to the premix, and mixes thoroughly again. The user should take care not to allow the NDPT and the radial initiator (peroxide compound) to contact each other directly. Hence, these two components should be added and mixed separately, in two separate steps, radical initiator first, with mixing between additions.

Example Repair Composition A8 as described in Table 3 was prepared, but with varying amounts of NDPT as indicated in Table 4, below. The time to cure was measured for the different compositions at the indicated temperatures. Results are shown in Table 4, below.

TABLE 4

Estimated Cure Time Adjustments, Repair Product A

| Temperature (° F.) | Benzoyl Peroxide (wt %) | NDPT added (wt %) | Cure Time (minutes) |
|---|---|---|---|
| 90 | 0.68 | 0 | 18 |
| 80 | 0.68 | 0 | 22 |
| 70 | 0.68 | 0 | 25 |
| 70 | 0.68 | 0 | 28 |
| 45 | 0.68 | 0 | 40 |
| 45 | 1.36 | 0.12 | 20 |

TABLE 4-continued

Estimated Cure Time Adjustments, Repair Product A

| Temperature (° F.) | Benzoyl Peroxide (wt %) | NDPT added (wt %) | Cure Time (minutes) |
|---|---|---|---|
| 25 | 1.36 | 0 | 73 |
| 25 | 1.36 | 0.12 | 26 |
| 20 | 1.36 | 0 | 80 |
| 20 | 1.36 | 0.24 | 14 |

Example 4: Pothole Repair Kit

The example pothole repair kit includes various subcomponents that can be mixed immediately prior to use and allowed to cure within a pothole. Table 5 provides the complete contents of the kit. The aggregate & the BYK 410 radical initiator are shipped within the same box but are in separate plastic bags.

TABLE 5

Example Pothole Repair Kit.

| Component | Purpose | Amount/ Units | Percentage of total product |
|---|---|---|---|
| Degaroute 485 | binder | 8 pounds | 15.42% |
| BYK 410 | Rheology additive | 24 grams | 0.10% |
| Radical Initiator (BPO) | Radical initiator | 160 grams | 0.68% |
| Pigment | pigment | 80 grams | 0.34% |
| SNOW WHITE | filler | 8.65 pounds | 16.67% |
| Aggregate | Aggregate | 28 pounds | 53.97% |
| Sand | Silica sand | 6.65 pounds | 12.82% |

Example 5: Premix Preparation

The premix was manufactured according to the specifications below. The process was performed with good direct ventilation and proper personal protective equipment. All measurements were performed on equipment to achieve accuracy to at least about 1%. All mixing was done with a concrete mixer and an "eggbeater" attachment.

1. Into a 5-gallon plastic bucket, add 8 lbs (7.92 lbs to 8.08 lbs) binder resin, DEGAROUTE 485, to the bucket.
2. Add 42 mL (41 mL to 43 mL) RHEOBYK-410 to the bucket and mix using an "eggbeater" paddle and concrete mixing drill for 2 minutes.
3. Add 80 g (79.2 g to 80.8 g) black pigment.
4. Add 8.65 lbs (8.56 lbs to 8.74 lbs) SNOW WHITE filler.
5. Add 6.6 lbs (6.53 lbs to 6.66 lbs) resin-encapsulated silica sand and mix until homogeneous or at least two minutes and check weight of contents as weighing at least 23 lbs. If under 23 lbs, add additional resin-encapsulated silica sand to make up the difference.
6. Place lid onto the bucket and hammer home to seal the container. Lift bucket to 450 angle to check for leaks.

Example 6: General Method of Repairing a Pothole

Figure 2:
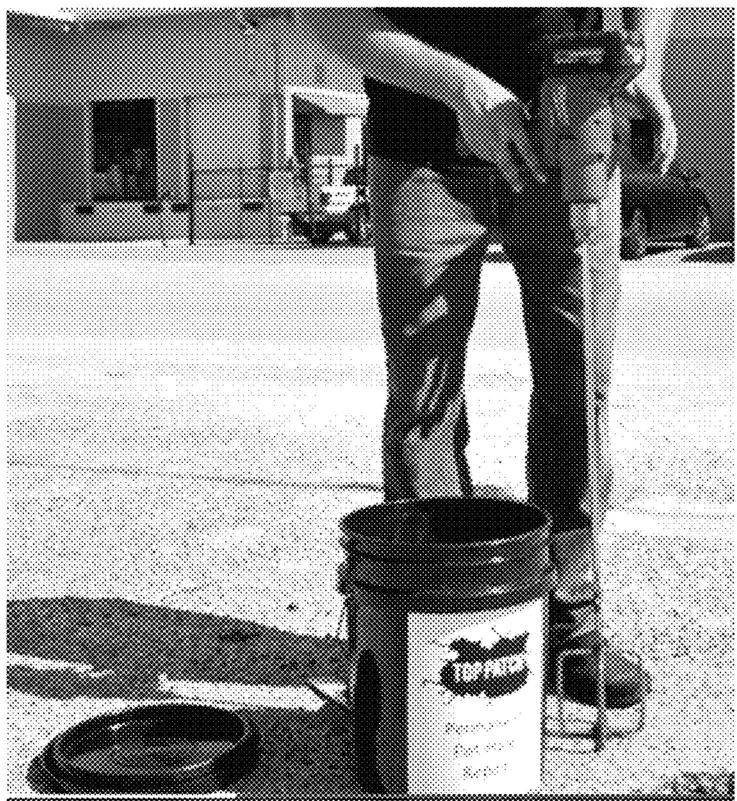
FIG. 2 is a flow chart showing general steps for using certain embodiments of the invention.
Figure 4:
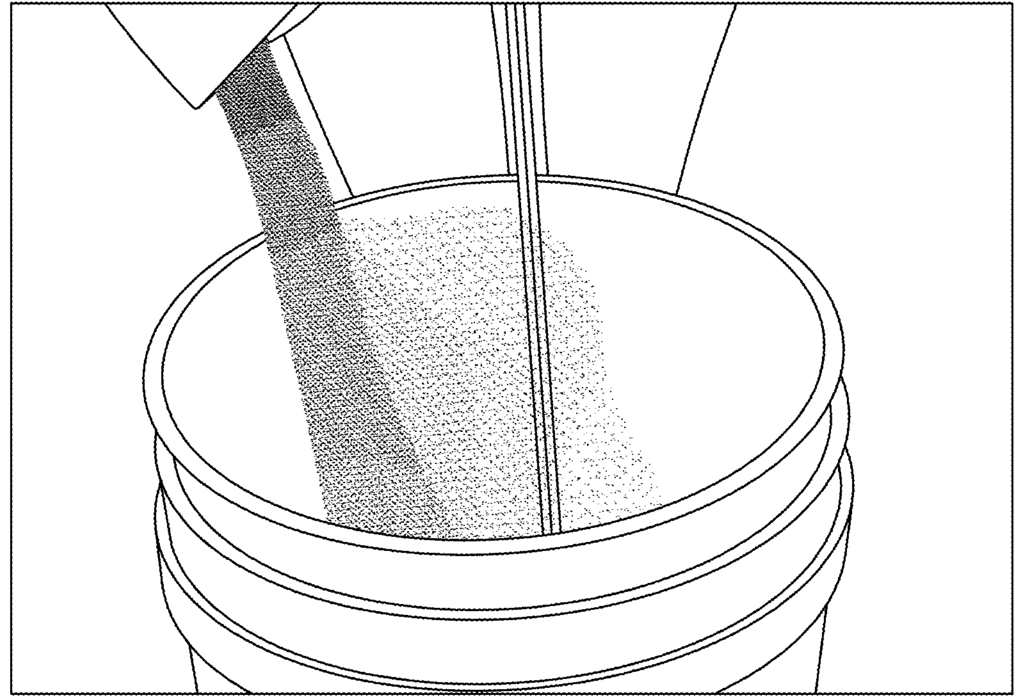
FIG. 4 is a photograph illustrating an example including a 5-gallon bucket comprising a premix composition according to various embodiments immediately prior to agitation with a drill fitted with an agitation blade.

A pothole was repaired using the following instructions. A first, optional, but highly recommended step according to various embodiments is to clean dirt and loose debris, and any grease or oil from any pothole that is to be filled. See FIG. 2 for a general flow chart showing typical pothole and other repairs. FIG. 2 shows a pothole that has been cleaned of loose debris. Once the pothole is prepared the materials should be placed near the pothole. A second, optional, but recommended step is to mix or agitate the premix composition to ensure that its components are evenly distributed. FIG. 4 is a photograph illustrating an example according to various embodiments, of a 5-gallon bucket comprising a premix composition according to various embodiments immediately prior to agitation with a drill fitted with an agitation blade. The drill preferably should be fully charged to ensure no interruptions occur during the following steps.

The radical initiator is added and thoroughly mixed into the composition, then the aggregate is added and mixed—the radical initiator is always added first. Mixing is done 1-2 minutes, until the material is homogenous, before going to next ingredient. The product is mixed for about 1-2 minutes, or until it is homogeneous, after each addition. Work should proceed quickly enough to complete filling in and smoothing the repair prior to the product's curing once the radical initiator of the repair kit is added, because polymerization will have been initiated. Aggregate then is added to the product and mixed. When the mixture is homogeneous, the product is poured into the defect, such as a pothole.

Figure 5:
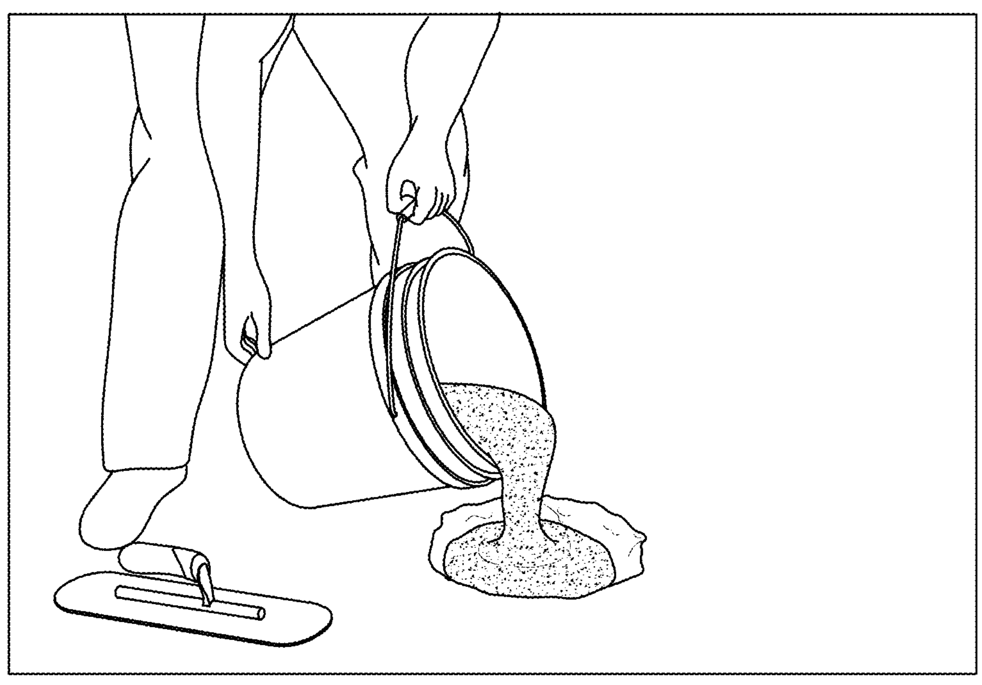
FIG. 5 is a photograph showing a user pouring the roadway repair product into a pothole.
Figure 6:
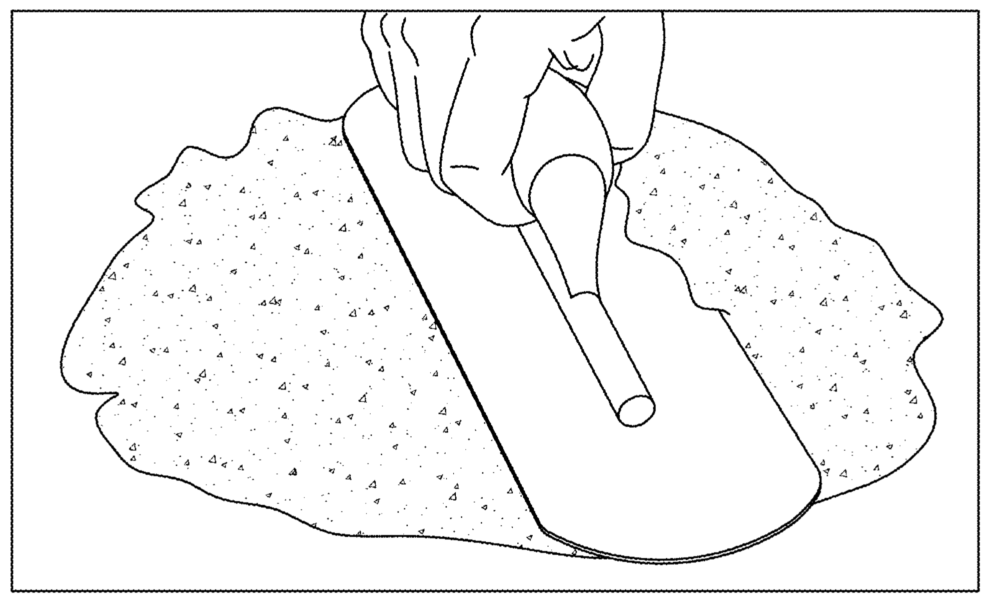
FIG. 6 is a photograph showing a user spreading the roadway repair product to smooth the repair and spread the compound over the edge to seal the defect.

Once all the components have been well-mixed for a time period of about 1-2 minutes and the composition is homogeneous, the repair formulation may be poured into the pothole to be repaired. See FIG. 5. Finally, the poured formulation may be evened out with a trowel or spreader, if needed, to seal the edges of the defect/pothole. See FIG. 6. A topping to improve the match of the repair to the existing pavement can be added. It is not necessary to overfill the pothole because the formulation, according to various embodiments, resists settling to any significant degree.

Example 7: Adhesion Test Results for Example Pothole Repair Formulation

Example Repair Composition A1 as described in Table 3 was prepared. This product was tested in accordance with ASTM D7234-19, a Standard Test Method for Pull-Off Adhesion Strength of Coatings on Concrete Using Portable Pull-Off Adhesion Testers. Each component of the product was mixed and conditioned (allowed to sit in a temperature controlled area for sufficient time to bring the material to a specific temperature) separately at 75° F.±2° F. The mixed system was applied at a ½ in. thickness on a concrete substrate and on an asphalt substrate. The samples were allowed to cure for 24 hours before testing per the test methods listed. See Table 6, below, for results.

TABLE 6

Test Results, ASTM D7234-19.

| Property | Test Method | Results |
|---|---|---|
| Adhesive Strength on Concrete, psi (24 hour cure @75° F., 30 psi/minute | ASTM D7234 | 382 psi (100% Concrete Failure) |
| Adhesive Strength on Asphalt, psi (24 hour cure @75° F., 30 psi/minute | ASTM D7234 | 212 psi (100% Asphalt Failure) |
| Adhesive Strength on Worn Asphalt, psi (24 hour cure @75° F., 30 psi/minute | ASTM D7234 | 225 psi* (100% Glue Failure) |

*The adhesive used to apply the bond tops in this test failed at 225 psi, so that the test could not be completed. "Bond tops" refers to the substrates that the test material is applied to for the testing.

Example 8: Roadway Repair for Potholes

A pothole in asphalt was repaired as follows. The pothole area was prepared using a leaf blower or a brush to remove loose debris in and around the hole. Any oil or grease was removed, preferably by grinding. Masking tape was applied in a square/rectangular formation around the hole, or the area was marked with chalk to identify the repair area(s). This last step is optional. The area was protected from vehicular and pedestrian traffic using control devices (such as tape and/or traffic cones).

To begin the repair process, a repair kit according to the invention was opened (in fresh air) and the components mixed in case of settling. Using a concrete mixing drill and an "eggbeater" paddle, the premix was mixed 1.5 minutes, radical initiator was added and then mixed again for one minute. Overmixing is not recommended as the product will begin to cure once mixed. The aggregate was added and mixed until the product was homogenous, or for at least one minute. NDPT was added at this time in batches where a faster cure time is wanted. The fully mixed product then was poured into the pothole, without overfilling, to bring the level to the edge of the pothole. A device for spreading (for example, a pool trowel or urethane trowel) was used to distribute and feather the repair material over the edge of the pothole to seal the edges. The repair is allowed to cure. The tools were cleaned of repair materials using shop towels and acetone.

Example 9: Roadway Repair for Alligator Cracking, Delamination, Slippage, or Raveled Pavement The area of damaged pavement was cleaned using a leaf blower and brush to remove loose debris in and around the defect(s) The area was protected using traffic control devices. The repair product materials were opened in the open air and each component mixed briefly in case of settling. The premix was mixed with a drill and "eggbeater" paddle for at least 1.5 minutes. The radial initiator was added and the product mixed for one minute. Aggregate was then added and the product mixed until homogeneous, at least one minute. The mixed repair composition then was poured over the damaged pavement, pushed into the crevices, and smoothed with a trowel/spreader to ensure all defects or any cracks are filled, to spread the product evenly throughout the repair area. The product is allowed to cure and the area cleared. Tools were cleaned with shop towels and acetone.

Example 10: Roadway Repair at Asphalt-Concrete Joint

The area to be filled or repaired was cleared of loose debris, and the repair product was opened. Each component was mixed in case of any settling. The premix was mixed for 1.5 minutes, the radical initiator was added, and the product mixed again until homogenous, for at least one minute. The product was poured over the asphalt/concrete joint and smoothed with a trowel to ensure all cracks and joints were filled and the product was even. If needed, the product was pushed into the crevices like grout. The product was allowed to cure and the area cleaned up. Tools were cleaned with shop towels and acetone.

Example 11: Kits

Embodiments of the invention include kits that contain a first container of a premix composition, a second container of aggregate, a third container of radical initiator, and an optional fourth container of NDPT. Optionally, in the "shaker kit" embodiments, the aggregate is contained in the first container with the premix, thus the kit contains a first container of premix composition and aggregate, a second container of radical initiator, and optionally a third container of NDPT. Examples of kits are shown in Table 7, below. These kits were prepared with the listed amounts of each component, to prepare a Repair Product A or Repair Product B as indicated, and then used to make a repair as shown in the Table, with the resulting cure times as shown.

TABLE 7

Kit Examples.

| Kit Example (Product Type) | Pre-Mix (lbs) | Aggregate (grams) | Radical Initiator (grams) | NDPT (grams) | Temperature (° F.) | Repair Type | Cure Time (minutes) |
|---|---|---|---|---|---|---|---|
| K1 (A) | 23 | 1270 | 100 | 0 | 98 | pothole | 320 |
| K2 (A) | 23 | 1270 | 200 | 0 | 63 | alligator | 38 |
| K3 (A) | 23 | 1270 | 200 | 26 | 28 | slippage | 21 |
| K4 (A) | 23 | 1270 | 200 | 26 | 44 | delamination | 17 |
| K5 (B) | 23 | 22226 | 200 | 0 | 91 | pothole | 18 |
| K6 (B) | 23 | 22226 | 200 | 52 | 38 | pothole | 17 |
| K7 (B) | 23 | 22226 | 300 | 0 | 61 | pothole | 29 |

Example 12: Comparative Example of Roadway Repair Composition

A roadway repair product is made as shown in Table 3 for example A1 except that DEGAROUTE 465 replaced the DEGAROUTE 485 in the product. DEGAROUTE 465 is cristobalite at about 20% to about 30% by weight, n-butyl acrylate at about 5% to about 10% by weight, methyl methacrylate at about 5% to about 10% by weight, and N,N-bis-(2-hydroxypropyl)-p-toluidine at about 0.1% to about 1% by weight. The resulting finished product was soft and unsupportive, and would not cure. Without wishing to be bound by theory, it is believed that the high amount of cristobalite causes these effects.

The appearance, hardness, durability of the inventive products are preferred by customers. In particular, if the cured product does not cure and become hard, the material cannot support the weight of traffic, whether pedestrians, bicycles, or heavy trucks. The superior adhesive and textural qualities of the inventive products provide a material that retains its shape and mass over time and adheres well to the repaired areas and remain in place. Inferior quality prior art products lack the strength to withstand the constant weight demands of a roadway and remain an intact mass that adheres to the roadway defect. Thus, these products soon begin to break apart or come loose. The products of this invention overcome these problems.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern. For example, the following references are incorporated by reference in their entireties:

1. U.S. Pat. No. 10,428,217
2. U.S. Pat. No. 9,328,024
3. United States Patent Application No. 2014-0056643
4. United States Patent Application No. 2009-0067926
5. degafloor.com/mma-resin-flooring-products/degafill-permanent-pothole-repair/

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for repairing a damaged area of a substrate selected from asphalt, concrete, or a combination thereof, the method comprising providing a roadway repair kit comprising a first container comprising a pre-mix composition, a second container comprising one or more aggregate compositions, a third container comprising one or more radical initiators, and a fourth container comprising N,N-dimethyl-p-toluidine;

determining an ambient temperature at a damaged area;

determining an expected cure time for an unmodified composition for the roadway repair, the unmodified composition comprising a combination of all components of the first container, the second container, and the third container at the ambient temperature;

determining a preparation time required to mix all components of the first container, the second container, and the third container to produce the unmodified composition for roadway repair;

determining a pour time required to pour the unmodified composition for roadway repair into the damaged area;

determining a required cure time, wherein the required cure time is greater than a sum of the preparation time and the pour time;

comparing the required cure time to the expected cure time;

if the expected cure time is greater than or equal to the required cure time, preparing the unmodified composition for roadway repair, and filling the damaged area with the unmodified composition for roadway repair;

if the expected cure time is less than the required cure time, preparing a modified composition for roadway repair by mixing all components of the first container, the second container, the third container, and the fourth container, and filling the damaged area with the modified composition for roadway repair;

wherein the pre-mix composition comprises:

a) about 25 wt % to about 51 wt % of a solution containing about 20 wt % to about 30% of one or more acrylic or methacrylic polymer precursor binder compounds;

b) about 18 wt % to about 74 wt % of one or more fillers;

c) about 14 wt % to about 57 wt % of silica sand;

d) about 0 wt % to about 2.25 wt % of one or more pigments, and e) about 0 wt % to about 2 wt % percent by weight of one or more rheology additives.

2. The method of claim 1, wherein the composition for roadway repair cures within a time of from 1 to 10 minutes, after which the substrate is ready to be driven upon.

* * * * *